United States Patent
Lafuente Cerda et al.

(10) Patent No.: US 9,890,315 B2
(45) Date of Patent: Feb. 13, 2018

(54) USE OF POLYLYSINE AS A SHALE INHIBITOR

(75) Inventors: Oscar Lafuente Cerda, Ebersberg (DE); Bernd Bruchmann, Freinsheim (DE); Sophie Maitro-Vogel, Mannheim (DE); Marta Reinoso Garcia, Dossenheim (DE)

(73) Assignee: BASF SE, Ludwigshafen (DE)

( * ) Notice: Subject to any disclaimer, the term of this patent is extended or adjusted under 35 U.S.C. 154(b) by 541 days.

(21) Appl. No.: 13/528,317

(22) Filed: Jun. 20, 2012

(65) Prior Publication Data

US 2013/0123148 A1 May 16, 2013

Related U.S. Application Data

(60) Provisional application No. 61/512,417, filed on Jul. 28, 2011.

(51) Int. Cl.
C09K 8/60 (2006.01)
C09K 8/08 (2006.01)
C09K 8/22 (2006.01)

(52) U.S. Cl.
CPC .......... C09K 8/08 (2013.01); C09K 8/22 (2013.01); C09K 2208/12 (2013.01)

(58) Field of Classification Search
CPC . C09K 8/035; C09K 8/58; C09K 3/30; C09K 5/045; C09K 8/80; C09K 2205/22; C09K 2205/40; C09K 2208/00; C09K 2208/34; C09K 3/00; C09K 8/032; C09K 8/38; C09K 8/524; C09K 8/56; C09K 8/68; C09K 8/60; E21B 10/322; E21B 10/5673; E21B 10/573; E21B 15/00; E21B 19/06; E21B 21/001; E21B 33/12; E21B 43/08; E21B 44/00; E21B 47/00; E21B 47/122; E21B 10/52; E21B 17/08; E21B 19/00; E21B 19/10; E21B 10/28; E21B 10/32; E21B 10/5735; E21B 10/62; E21B 17/00; E21B 17/012; E21B 17/1014; E21B 17/1042; E21B 17/20; E21B 19/08; E21B 19/14; E21B 19/161; E21B 19/22; E21B 2034/007

See application file for complete search history.

(56) References Cited

U.S. PATENT DOCUMENTS

| | | | |
|---|---|---|---|
| 5,149,690 A | 9/1992 | Patel et al. | |
| 5,908,814 A * | 6/1999 | Patel | C09K 8/18 507/112 |
| 6,484,821 B1 | 11/2002 | Patel et al. | |
| 7,786,240 B2 | 8/2010 | Bruchmann et al. | |
| 2004/0220058 A1* | 11/2004 | Eoff | C08F 220/34 507/200 |
| 2005/0194140 A1* | 9/2005 | Dalrymple | C09K 8/5083 166/279 |
| 2008/0058229 A1* | 3/2008 | Berkland | C09K 8/516 507/211 |
| 2009/0048416 A1* | 2/2009 | Bruchmann | C07K 14/001 528/15 |
| 2009/0239771 A1 | 9/2009 | Federici et al. | |
| 2010/0222539 A1 | 9/2010 | Bruchmann et al. | |
| 2010/0249369 A1 | 9/2010 | Bruchmann et al. | |

FOREIGN PATENT DOCUMENTS

| | | |
|---|---|---|
| EP | 0 634 468 A1 | 1/1995 |
| WO | WO 2004/011771 * | 2/2004 |
| WO | WO 2007/060119 * | 5/2007 |
| WO | WO 2007/060119 A1 | 5/2007 |
| WO | WO 2008/031806 A1 | 3/2008 |
| WO | WO 2013/013889 * | 1/2013 |

OTHER PUBLICATIONS

Regis D. Gougeon et al., Direct observation of polylysine side-chain interaction with smectite interlayer surfaces through 1H-27 Al hetronuclear correlation NMR Spectroscopy, Langmuir, 2002, 18, 3396-3398.*

Written Opinion of the International Searching Authority for the WO (2013/013889) e.g. PCT/EP2012/061408 dated Jan. 28, 2014.*

Scholl, et al. "The Thermal Polymerization of Amino Acids Revisited; Synthesis and Structural Characterization of Hyperbranched Polymers from L-Lysine", J. Polymer Sci. (2007), pp. 5494-5508.

* cited by examiner

*Primary Examiner* — Kumar R Bhushan
(74) *Attorney, Agent, or Firm* — Oblon, McClelland, Maier & Neustadt, L.L.P.

(57) ABSTRACT

What is proposed is the use of hyperbranched polylysine in the development, exploitation and completion of underground mineral oil and natural gas deposits, and in deep wells, especially as a shale inhibitor in water-based drilling muds, completion fluids or stimulation fluids.

13 Claims, 1 Drawing Sheet

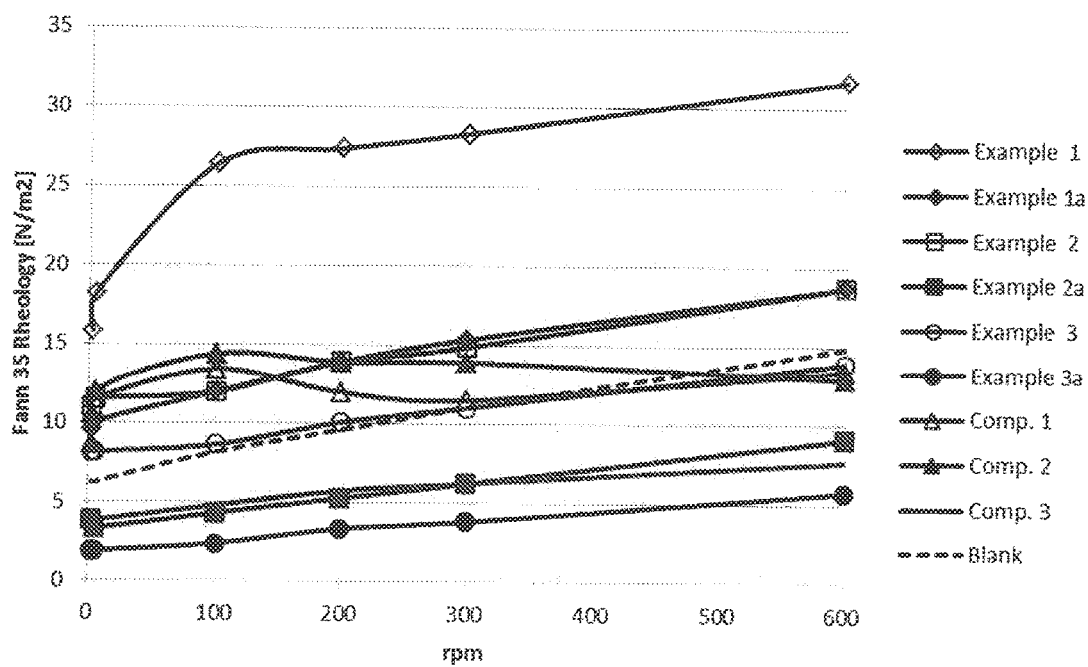

USE OF POLYLYSINE AS A SHALE INHIBITOR

This application claims the benefit of U.S. Application No. 61/512,417, filed on Jul. 28, 2011.

The present invention relates to the use of hyperbranched polylysine in the development, exploitation and completion of underground mineral oil and natural gas deposits, and in deep wells.

Shale is a fine impermeable sedimentary rock consisting of clay and other minerals. It is one of the most common rocks which have to be drilled through in oilfields to get to the oil layer. Due to its high proportion of ionically charged clay, shale has a great tendency to swell with water. This makes it a very problematic rock in deep wells with water-based drilling muds. A "shale inhibitor" has the function of preventing the shale from swelling with water.

EP 0634468 A1 describes additives for drilling muds and methods which prevent the swelling of clays in underground wells. In one embodiment, a trihydroxyalkylamine is reacted with an alkyl halide or a water-soluble quaternary amine to give a quaternized trihydroxyalkylamine. The reaction products may also include condensed reaction products of quaternized trihydroxyalkylamines. In a further embodiment, a choline derivative is used. The quaternized reaction products and the choline derivatives are notable for low toxicity and good compatibility with anionic drilling mud components. There are reports of an improvement in rheological properties of the drilling muds and of an improvement in the environmental compatibility and compatibility with the drilling muds.

U.S. Pat. No. 6,484,821 B1 describes a water-based drilling mud for drilling through formations comprising water-swellable shale. This preferably comprises a water-based continuous phase, a weighting material and a shale hydration inhibition agent of the formula $H_2N-R-\{OR'\}_x-Y$ where R and R' are each alkylene groups having 1-6 carbon atoms and x corresponds to a value of about 1 to about 25. The Y group should be an amine or alkoxy group, preferably a primary amine or a methoxy group. The shale hydration inhibition agent should be present in a concentration sufficient for the reduction of the swelling of the shale. EP 1257610 B1, which is parallel to U.S. Pat. No. 6,484,821 B1, more precisely specifies a compound of the formula $H_2N-CH(CH_3)CH_2-\{OCH_2CH(CH_3)\}_x-NH_2$ as a shale inhibitor, where x has a value of less than 15.

WO 2008/031806 A1 describes neutral or salt-type condensation products of $C_{4-10}$-dicarboxylic acids with alkanolamines, diamines or polyalkyleneairaines as shale inhibitors.

U.S. Pat. No. 5,149,690 describes drilling mud additives which suppress the swelling of shale, in the form of polyamides and polyamino acids as reaction products of an aliphatic acid with an aliphatic polyamine. The "polyamino acids" mentioned therein are structurally incomparable to polylysine, especially because they have free acid functions whereas polylysine has free amine functions. Chemicals for offshore applications must meet strict environmental regulations. They must be nontoxic and biodegradable, and must not be bioaccumulable; see http://www.cefas.defra.gov.uk, especially http://www.cefas.defra.gov.uk/industry-information/offshore-chemical-notification-scheme.aspx, http://www.cefas.defra.gov.uk/industry-information/offshore-chemical-notification-scheme/ocns-ecotoxicology-testing.aspx and http://www.cefas.defragov.uk/industry-information/offshore-chemical-notification-scheme/hazard-assessment.aspx (retrieved Jan. 6, 2011).

The problem underlying the present invention was that of providing a nontoxic biodegradable non-bioaccumulable advantageous shale inhibitor.

This object is achieved by the features of the independent claim. The dependent claims relate to preferred embodiments.

It has been found that, surprisingly, hyperbranched polylysine, especially quaternized hyperbranched polylysine, is a very good shale inhibitor and is also biodegradable.

The present invention provides for the use of hyperbranched polylysine in the development, exploitation and completion of underground mineral oil and natural gas deposits, and in deep wells, especially as a shale inhibitor in water-based drilling muds, completion fluids or stimulation fluids for stimulation of underground mineral oil and natural gas deposits.

In the context of the present invention, the generic term "polylysine" includes straight-chain, branched, hyperbranched and dendrimeric polylysines. Polylysine is a polycondensation product of the amino acid lysine. Polylysine may be of the following general formula (i), since the terminal ε-amino function of the molecule is more readily accessible to further condensation than the α-amino group.

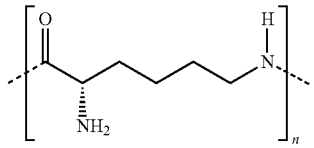

(I)

However, the α-amino group also exhibits a certain reactivity, and so branched, hyperbranched and even dendrimeric polylysines are obtainable. In our WO 2007/060119 A1 we describe syntheses which lead to hyperbranched polylysines.

For a definition of hyperbranched and dendrimeric polymers see also P. J. Flory, J. Am. Chem. Soc. 1952, 74, 2718 and H. Frey at al., Chemistry—A European Journal, 2000, 6, No. 14, 2499.

The term "hyperbranched" in the context of the present invention is to be understood to mean that the degree of branching (DB) is 10 to 99.9%, preferably 20 to 99%, more preferably 20 to 95%. "Dendrimeric", in contrast, is to be understood to mean that the degree of branching is 99.9 to 100%. These definitions correspond to the definitions according to WO 2007/060119 A1.

The degree of branching of the hyperbranched polylysine of the invention is defined as

DB [%]=100*(T+Z)/(T+Z+L)

where T is the mean number of terminal monomer units, Z is the mean number of branched monomer units and L is the mean number of linear monomer units. For the definition of the degree of branching see also H. Frey at al Acta Polym. 1997, 48, 30.

The molecular weight ($M_w$) of the hyperbranched polylysine of the invention is in the range of 500 to 10 000 g/mol, preferably in the range of 750 to 7 500 g/mol, particularly in the range of 750 to 5 000 g/mol and especially in the range of 750 to 1500 g/mol.

The nitrogen atoms of the polylysine are preferably quaternized with $C_{1-4}$ alkyl groups. The quaternizing agent used may, for example, be a $C_{1-4}$-haloalkane, especially a bromo- or iodoalkane, or dimethyl sulphate. Preference is given to virtually complete quaternization. This can be determined, for example, using the amine number of the quaternized polylysine, i.e. that amount of KOH in mg which is equivalent to the remaining amine content of 1 g of polylysine. More preferably, no free amine functions are present any longer in the quaternized polylysine.

The polylysine is appropriately used in a concentration of 1 to 30 g/l, preferably 3 to 25 g/l and especially 5 to 10 g/l of water. It is preferably used together with water retention agents, rheology modifiers, dispersants, thinners, lubricants and/or other compositions commonly used in drilling muds, completion fluids or stimulation fluids.

The biodegradability of the polylysine used in accordance with the invention, measured by the method described in "OECD Guidelines for Testing of Chemicals—1992 OECD 306: Biodegradability in Seawater, Closed Bottle Method", is preferably at least 15% after 28 days and preferably at least 50% after 60 days.

The present invention is now illustrated in detail by the examples which follow with reference to the appended drawing. The drawing shows:

FIG. 1 a graphic representation of the Faun 35 values according to Table 2.

EXAMPLES

Preparation of the Polylysines

Example 1

A 4 l four-necked flask equipped with stirrer, internal thermometer, gas inlet tube and descending condenser with vacuum connection and collecting vessel was charged with 1000 g of L-lysine hydrochloride, 219.1 g of solid sodium hydroxide, 100 g of water and 0.02 g of dibutyltin dilaurate, and the mixture was heated gradually to an internal temperature of 130° C. while stirring, in the course of which the mixture foamed slightly. After a reaction time of 5 hours, water was distilled off under reduced pressure (200 mbar), in the course of which the temperature was increased gradually to 160° C. and the pressure reduced to 10 mbar after the majority of the water had distilled over. After 8 hours, 260 g of water had been collected as distillate. The high-viscosity polymer was discharged while hot and poured into an aluminium dish.

To determine the molecular weight distribution, the product was dissolved in water, and the solution was filtered and analyzed by GPC. The GPC was conducted by means of a column combination of OHpak SB-803 HQ and SB-804 HQ (from Shodex) with addition of 0.1 mol/l sodium hydrogencarbonate at 30° C. with a flow rate of 0.5 ml/min and polyethylene oxide as a standard. For detection, a UV detector was used, which worked at a wavelength of 230 nm. The mean molecular weight was determined as $M_n$=1400 g/mol and $M_w$=4300 g/mol.

The degree of branching (DB) was 0.35 (i.e. 35%). It was determined by the method described in M. Scholl, T. Q. Nguyen, B. Bruchmann, H.-A Klok, J. Polym. Sci.: Part A: Polym. Chem. 45, 2007, 5494-5508.

The amine number (AN) was determined on the basis of DIN 53176. However, in contrast to the DIN method specified, this involved titration with a glacial acetic acid/trifluoromethanesulphonic acid mixture and potentiometric determination of the end point. The amine number was 278 mg KOH/g.

Example 2

A 4 l four-necked flask equipped with stirrer, internal thermometer, gas inlet tube and descending condenser with vacuum connection and collecting vessel was charged with 1000 g of L-lysine hydrochloride, 219.1 g of solid sodium hydroxide, 150 g of water and 0.1 g of dibutyltin dilaurate, and the mixture was heated gradually to an internal temperature of 150° C. while stirring, in the course of which the mixture foamed slightly and water distilled off at standard pressure. After a reaction time of 4 hours, distillative removal continued under reduced pressure (400 mbar), in the course of which the temperature was increased gradually to 160° C. After 8 hours, 340 g of water had been collected as distillate. The high-viscosity polymer was discharged while hot and poured into an aluminium dish.

The mean molecular weight, the amine number and the degree of branching were determined according to the details of Example 1. $M_n$=1200 g/mol and $M_w$=2800 g/mol; the AN was 310 mg KOH/g and the DB was 0.41 (i.e. 41%)

Example 3

A 4 l four-necked flask equipped with stirrer, internal thermometer, gas inlet tube and descending condenser with vacuum connection and collecting vessel was charged with 1000 g of L-lysine hydrochloride, 219.1 g of solid sodium hydroxide, 150 g of water and 0.02 g of dibutyltin dilaurate, and the mixture was heated gradually to an internal temperature of 130° C. while stirring, and the temperature was increased gradually up to 150° C. over the course of 5 hours. During this reaction time, 218 g of water were distilled off under reduced pressure. The pressure was then reduced to 200 mbar and the internal temperature increased to 160° C., in the course of which another 88 g of water distilled over. The high-viscosity polymer was discharged while hot and poured into an aluminium dish.

The mean molecular weight, the amine number and the degree of branching were determined according to the details of Example 1. $M_n$=660 g/mol and $M_w$=950 g/mol; the AN was 379 mg KOH/g and the DB was 0.57 (i.e. 57%).

Quaternization of the Polylysines

Example 1a

A 500 ml flask with stirrer is initially charged with the polylysine from Example 1 (100.9 g), which is diluted with water (100.9 g). Dimethyl sulphate (1 mol, 126.1 g) is metered in gradually. The reaction mixture is stirred at room temperature for two days. The conversion (degree of quaternization) is monitored via the amine number. After two days, the amine number is 0.08 mmol/g and the degree of quaternization is 95%. The excess dimethyl sulphate is hydrolyzed at 80° C. for 6 hours. A brown solution is obtained (280.9 g, solids content 67%).

Example 2a

A 500 ml flask with stirrer is initially charged with the polylysine from Example 2 (90.5 g), which is diluted with water (90.5 g). Dimethyl sulphate (1 mol, 126.1 g) is metered in gradually. The reaction mixture is stirred at room temperature for two days. The conversion (degree of quaternization) is monitored via the amine number. After two days, the amine number is 0.00 mmol/g and the degree of quaternization is 100%. The excess dimethyl sulphate is hydrolyzed at 80° C. for 6 hours. A brown solution is obtained (242.5 g, solids content 70%).

Example 3a

A 500 ml flask with stirrer is initially charged with the polylysine from Example 3 (70.4 g), which is diluted with water (74.0 g). Dimethyl sulphate (1 mol, 126.1 g) is metered in gradually. The reaction mixture is stirred at room temperature for two days. The conversion (degree of quaternization) is monitored via the amine number. After two days, the amine number is 0.00 mmol/g and the degree of quaternization is 100%. The excess dimethyl sulphate is hydrolyzed at 80° C. for 6 hours. A brown solution is obtained (287.7 g, solids content 64%).

Performance Tests 350 ml of tap water are introduced into a beaker, 2.5 g of the shale inhibitor (calculated as dry mass—i.e. quaternized or non-quaternized polylysine or a prior art product) are added and the mixture is stirred for 20 min. The solution is transferred into an HB mixing cup. 30 g of Cebogel® NT (Bentonite, Cebo Holland B.V., The Netherlands) are added as a model substance for shale and the mixture is stirred at low speed for 10 min. Subsequently, the Fann rheology and the gel strength are determined.

The shale inhibitors (Examples 1-3 and Examples 1a-3a) according to the invention and Comparative shale inhibitors (Comparative 1-3) are listed in Table 1 below.

TABLE 1

| Sample | Mn | Mw | AN | Solids [%] | Sample | Solids [%] |
|---|---|---|---|---|---|---|
| Example 1 | 1400 | 4300 | 278 | 100 | Example 1a | 67 |
| Example 2 | 1150 | 2840 | 310 | 100 | Example 2a | 70 |
| Example 3 | 660 | 948 | 379 | 100 | Example 3a | 64 |
| Comp. 1 | Basodrill ® 3200 (shale inhibitor from BASF SE) | | | | | |
| Comp. 2 | Ultrahib ® (shale inhibitor from M-I SWACO) | | | | | |
| Comp. 3 | Cholinchlorid (BASF SE) | | | | | |

The results are reproduced in Table 2 below and in graphic form in FIG. 1.

TABLE 2

| | 7.14 g/l Shale Inhibitor and 85.7 g/l Bentonite | | | | | | | | | | |
|---|---|---|---|---|---|---|---|---|---|---|---|
| | Fann 35 values [Pa] | | | | | | Gel strength [Pa] | | PV | YP | |
| Sample | 600 | 300 | 200 | 100 | 6 | 3 | 10" | 10' | [mPa*s] | [Pa] | pH |
| Example 1 | 32 | 28 | 27 | 26 | 18 | 16 | 12 | 11 | 7 | 25 | 9.0 |
| Example 1a | 19 | 15 | 14 | 12 | 10 | 10 | 9 | 18 | 7 | 12 | 9.0 |
| Example 2 | 19 | 15 | 14 | 12 | 12 | 11 | 10 | 17 | 8 | 11 | 9.0 |
| Example 2a | 9 | 6 | 5 | 4 | 3 | 4 | 4 | 8 | 6 | 3 | 9.1 |
| Example 3 | 14 | 11 | 10 | 9 | 8 | 8 | 9 | 15 | 6 | 8 | 9.0 |
| Example 3a | 6 | 4 | 3 | 2 | 2 | 2 | 2 | 4 | 4 | 2 | 9.1 |
| Comp. 1 | 13 | 12 | 12 | 13 | 12 | 11 | 9 | 9 | 4 | 10 | 9.1 |
| Comp. 2 | 13 | 14 | 14 | 14 | 12 | 9 | 6 | 5 | -2 | 15 | 9.1 |
| Comp. 3 | 8 | 6 | 6 | 5 | 4 | 4 | 3 | 3 | 3 | 5 | 9.1 |
| Blank | 15 | 11 | 10 | 8 | 6 | 6 | 10 | 19 | 8 | 7 | 9.2 |

Rheology at Different pH Values

The performance tests on the samples according to Example 2a and Comparative sample 2 are repeated at different pH values. The results are reproduced in Table 3. It is found that the pH value affects the inventive sample (Example 2a) much less than Comp. sample 2 (Ultrahib®).

TABLE 3

| | Fann 35 values [Pa] | | | | | | Gel strength [Pa] | | PV | YP | |
|---|---|---|---|---|---|---|---|---|---|---|---|
| Sample | 600 | 300 | 200 | 100 | 6 | 3 | 10" | 10' | [mPa*s] | [Pa] | pH |
| Example 2a | 9 | 6 | 5 | 4 | 3 | 4 | 4 | 8 | 6 | 3 | 9.0 |
| | 10 | 7 | 6 | 5 | 5 | 5 | 5 | 8 | 6 | 4 | 7.0 |
| | 12 | 9 | 8 | 7 | 6 | 7 | 7 | 12 | 6 | 6 | 5.0 |
| | 12 | 10 | 9 | 7 | 7 | 7 | 7 | 8 | 6 | 7 | 3.0 |
| | 12 | 8 | 7 | 6 | 7 | 7 | 6 | 13 | 7 | 5 | 0.0 |
| Comp. 2 | 13 | 14 | 14 | 14 | 12 | 9 | 6 | 5 | -2 | 15 | 9.0 |
| | 19 | 17 | 18 | 19 | 12 | 12 | 8 | 8 | 5 | 14 | 7.0 |
| | 13 | 10 | 10 | 9 | 10 | 9 | 6 | 7 | 6 | 7 | 5.0 |
| | 12 | 11 | 12 | 13 | 11 | 10 | 5 | 6 | 3 | 9 | 3.0 |
| | 22 | 22 | 22 | 23 | 11 | 10 | 9 | 7 | 1 | 21 | 0.0 |

Biodegradability

According to the method described in "OECD Guidelines for Testing of Chemicals—1992 OECD 306: Biodegradability in Seawater, Closed Bottle Method", the biodegradability of the quaternized polylysine according to Example 3a, of Comp. sample 2 (Ultrahib®) and of a reference substance (sodium benzoate) was evaluated after 28 days and 60 days.

TABLE 4

| Material | Day 28 | Day 60 |
|---|---|---|
| Example 3a | 38% | 52% |
| Comp. 2 | <10% | — |
| Reference | 80% | 70% |

The results indicate a much better biodegradability of the quaternized polylysine according to Example 3a than Ultrahib®, a commercial shale inhibitor. Moreover, the 28 day biodegradability of the quaternized polylysine according to Example 3a meets the regulatory requirements.

The invention claimed is:

1. A method of providing a shale inhibitor in a water-based drilling mud, completion fluid, or stimulation fluid, the method comprising:
   adding to a drilling fluid an effective amount of a hyperbranched polylysine having a degree of branching and
   conducting a drilling operation in an oil or natural gas well with the drilling fluid comprising the hyperbranched polylysine,
   thereby providing a shale-inhibiting effect during the drilling operation in an oil or a natural gas well,
   wherein the degree of branching (DB) of the polylysine is 10 to 99.9% as defined by a combined molar amount of terminal monomer units and branched monomer units in the polylysine, with respect to a total molar amount of monomers in the polylysine;
   wherein the molecular weight ($M_w$) of the polylysine is in the range of 500 to 10,000 g/mol; and
   wherein the polylysine is present in the drilling fluid in a concentration of 1 to 30 of water.

2. The method according to claim 1, wherein the nitrogen atoms of the polylysine are quaternized with $C_{1-4}$-alkyl groups.

3. The method according to claim 1, wherein the polylysine is used in a concentration of 1 g/l of water.

4. The method according to claim 1, wherein the polylysine is used in a concentration of 3 to 25 g/l.

5. The method according to claim 1, wherein the polylysine is used in a concentration of 5 to 10 g/l.

6. The method according to claim 1, wherein the biodegradability of the polylysine, as measured by the method described in "OECD Guidelines for Testing of Chemicals—1992 OECD 306: Biodegradability in Seawater, Closed Bottle Method", is at least 15% after 28 days and at least 50% after 60 days.

7. The method according to claim 3, wherein the biodegradability of the polylysine, as measured by the method described in "OECD Guidelines for Testing of Chemicals—1992 OECD 306: Biodegradability in Seawater, Closed Bottle Method", is at least 15% after 28 days and at least 50% after 60 days.

8. The method according to claim 3, wherein the drilling fluid further comprises at least one member selected from the group consisting of water retention agent, a rheology modifier, a dispersant, a thinner and a lubricant.

9. The method according to claim 1, wherein DB is from 20-99%.

10. The method according to claim 1, wherein DB is from 20-95%.

11. The method according to claim 1, wherein the molecular weight of the polylysine is from 750 to 7,500 g/mol.

12. The method according to claim 1, wherein the molecular weight of the polylysine is from 750 to 1,500 g/mol.

13. The method of claim 1, wherein the hyperbranched polylysine consists of polycondensed lysine.

* * * * *